(12) United States Patent
McCrady et al.

(10) Patent No.: US 8,041,336 B2
(45) Date of Patent: Oct. 18, 2011

(54) METHODS AND APPARATUS FOR ACCURATELY DETERMINING SIGNAL TIME OF ARRIVAL

(75) Inventors: Dennis D. McCrady, Albuquerque, NM (US); Joshua Holden, Ridgewood, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 351 days.

(21) Appl. No.: 12/474,546

(22) Filed: May 29, 2009

(65) Prior Publication Data

US 2010/0304708 A1    Dec. 2, 2010

(51) Int. Cl.
*H04M 11/04* (2006.01)
*H03D 1/00* (2006.01)

(52) U.S. Cl. .......... 455/404.2; 455/456.1; 375/142; 375/150; 375/343

(58) Field of Classification Search .......... 455/404.1, 455/404.2, 456.1, 456.5, 456.6; 375/142, 375/150, 324, 329, 340, 342, 343; 342/126, 342/450

See application file for complete search history.

(56) References Cited

U.S. PATENT DOCUMENTS

| | | | |
|---|---|---|---|
| 5,742,635 A | 4/1998 | Sanderford, Jr. | |
| 5,890,068 A * | 3/1999 | Fattouche et al. | 455/456.2 |
| 6,453,168 B1 | 9/2002 | McCrady et al. | |
| 6,665,333 B2 | 12/2003 | McCrady et al. | |
| 6,801,782 B2 | 10/2004 | McCrady et al. | |
| 7,649,936 B2 * | 1/2010 | Wagner et al. | 375/142 |
| 7,667,649 B2 * | 2/2010 | LeFever et al. | 342/465 |
| 7,899,085 B2 * | 3/2011 | Simmons | 455/456.1 |
| 2002/0118723 A1 | 8/2002 | McCrady et al. | |
| 2003/0115027 A1 | 6/2003 | Fernandez-Corbaton et al. | |
| 2006/0215736 A1 | 9/2006 | Rasmussen | |

FOREIGN PATENT DOCUMENTS

EP    1089452 A1    4/2001

OTHER PUBLICATIONS

European Search Report dated Sep. 2, 2010 cited in Application No. 10161703.3-1248.

* cited by examiner

*Primary Examiner* — Quochien B Vuong
(74) *Attorney, Agent, or Firm* — Edell, Shapiro & Finnan, LLC

(57) ABSTRACT

A technique for determining the time of arrival of a signal involves correlating a received signal with a correlation function to produce a stream of correlation samples including a peak sample, pre-peak samples, and post-peak samples. A curve matching table includes sets of values, where each set of values represents discrete points of a correlation function having a peak at a respective different time shift relative to the timing of the peak sample. The sets of values include first sets of values that are matched with a first set of samples having no post-peak samples from the correlation samples, and second sets of values that are matched with a second set of samples having at least one post-peak sample. The time of arrival of the signal is determined from the timing of the peak of the correlation function represented by the set of values that produces the best match.

20 Claims, 7 Drawing Sheets

METHODS AND APPARATUS FOR ACCURATELY DETERMINING SIGNAL TIME OF ARRIVAL

BACKGROUND

Accurate determination of signal timing is desirable in a wide variety of communication and navigation applications where precise, reliable signal reception is important. For example, state-of-the-art position location and communication systems can provide accurate, reliable three-dimensional position determination of a handheld or portable, spread spectrum communication device within milliseconds without interruption of voice or data communications. Among techniques employed to determine the position of a mobile communication device is the reception at the mobile communication device of multiple timing signals respectively transmitted from multiple transmitters at different, known locations. By determining the range or pseudo-range to each transmitter from the arrival time of the timing signals, the mobile communication device can compute its position using trilateration.

One example of a position-determination system involves a two-way round-trip ranging message scheme. A mobile communication device whose position is to be determined transmits outbound ranging messages to a group of reference transceivers. The reference transceivers, whose positions are known, respond by transmitting reply ranging messages. Upon reception of each reply ranging message, the mobile communication device determines the round-trip signal propagation time from which the range can be determined by subtracting the far-end turn-around time and internal processing delays from the elapsed time between transmission of the outbound ranging message and receipt of the corresponding reply ranging message. This round-trip approach avoids the need to synchronize the mobile communication device with the reference transceivers, since the relevant measurements are made in the same time frame of the mobile communication device.

Another example of a position-determination system is the RF ranging function built into the architecture of wireless communication systems such as those of Verizon Wireless or AT&T in the U.S. These systems take advantage of their infrastructure to generate RF ranging signals used for location determination. For example, the CDMA-based digital cellular standard IS-95 uses pilot tones for location determination. The synchronized pilot tones are sent from base stations and received by mobile handsets. One-way distance measurements are made by a particular handset to several base stations, and the data are sent to a central location where the trilateration calculation is made.

When measuring the range to an object or another device, a precise determination of the signal propagation time between the devices must be made. The signal propagation time can be derived by knowing the transmission and reception times of one or more ranging signals traveling along a direct path between the devices. The accuracy of the position determined by these systems depends largely on the accuracy with which the receiving devices can determine the time of arrival of the ranging signals traveling along a direct path between the devices. The IS-95 standard uses a one-way technique where pilot signals are transmitted by base stations and received by the mobile units being located. Time of arrival is determined by interpolating correlator output samples. The peak sample, one pre-peak sample, and one post-peak sample are used in the interpolation calculation to estimate the timing of the true peak of the correlation function. The timing of the peak of the correlation function corresponds to the time of arrival of the signal. The sample rate at the output of the correlator, 2.5 Msps, is twice the chip rate of 1.25 Mcps. However, use of the post-peak sample in the interpolation calculation increases susceptibility to multipath interference. Another shortcoming of this approach is the use of a standard PN sequence in the ranging waveform. This will result in a correlation function with high sidelobes and poor performance in multipath environments. Accordingly, there remains a need for improved techniques for accurately determining the time of arrival of signals in position-determination systems.

SUMMARY

A technique for determining the time of arrival of a signal received at a mobile communication device includes correlating the received signal in accordance with a correlation function to produce a stream of correlation samples. The correlation samples including a peak sample, a plurality of pre-peak samples, and a plurality of post-peak samples. The time of arrival of the signal corresponds to a timing of a peak of the correlation function, which generally lies in a vicinity of the peak sample.

A curve matching table is stored in the mobile communication device and includes a plurality of sets of values. Each of the sets of values represents discrete points of a correlation function having a peak at a respective different time shift relative to the timing of the peak sample. The sets of values are divided into first sets of values to be matched with a first set of samples from the stream of correlation samples and second sets of values to be matched with a second set of samples from the stream of correlation samples, where the second set of samples differs from the first set of samples.

Each of the first sets of values is matched to the first set of samples, where the first set of samples includes no post-peak samples. Each of the second sets of values is matched to the second set of samples, where the second set of samples includes at least one post-peak sample. One set of values from among the first and second sets of values produces a best match as a result of the matching. The time of arrival of the signal is determined from the timing of the peak of the correlation function represented by the set of values that produced the best match. A least-squares metric can be used to determine the best match.

The first sets of values represent time-shifted correlation functions having a peak after the peak sample, and the second sets of values represent time-shifted correlation functions having a peak before the peak sample. Because the technique relies primarily on pre-peak samples and primarily performs the curve matching on the leading-edge portion of the correlation function, multi-path interference is reduced relative to conventional interpolation techniques which rely equally on pre-peak and post-peak correlator samples. In this manner, a more accurate range measurement can be made, which support a more accurate determination of geographic position.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The invention overcomes the aforementioned difficulties by using leading edge curve matching of the correlation function to estimate signal time of arrival (TOA). Leading edge curve matching the correlation function increases the resolution of the TOA estimate and provides some degree of immunity to multipath. In essence, the leading edge of the correlation function is affected less when multipath is present than the peak or falling edge of the correlation function. Accuracy is improved by the higher resolution leading edge curve match in addition to the added multipath immunity from primarily using the leading edge of the correlation function. The leading edge curve matching technique described herein differs from conventional leading edge curve fitting schemes in a number of respects, including the selective use of one, or possibly more than one, post-peak sample to curve match in certain cases without significantly compromising the overall advantages of using primarily pre-peak samples that represent the leading edge of the correlation function.

Figure 1:
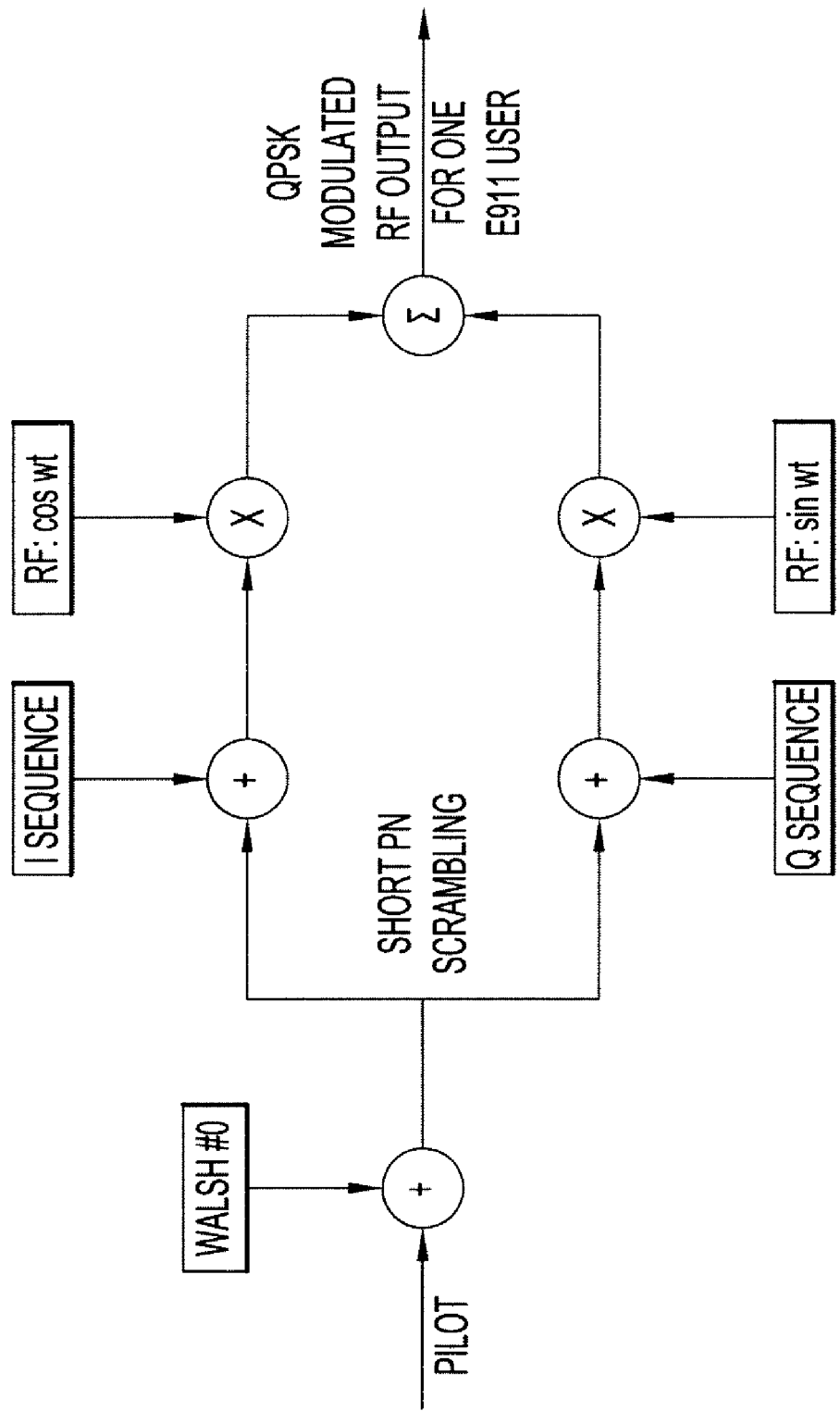
FIG. 1 is a block diagram illustrating a transmitter for generating a ranging signal using a pilot signal from the IS-95 standard.

The FCC has mandated that when a mobile telephone user makes an emergency call in the U.S., the service provider must be able to locate the user to within 50 meters within 30 seconds. This service is known as enhanced 911 (E911). One example of an RF ranging-based E911 service is provided by Verizon Wireless within their IS-95 system. FIG. 1 illustrates the relevant portions of a base transceiver subsystem (BTS) for generating an RF ranging channel for E911 based on the pilot signal from IS-95. As shown in FIG. 1, the pilot signal is first spread by Walsh code #0 and then split into baseband inphase (I) and quadrature (Q) components. The I component is then spread by an I sequence, and the Q component is spread by a Q sequence. The I and Q sequences are short PN scrambling codes that are 32,768 chips long and can be generated in similar but differently tapped 15-bit shift registers. The two sequences essentially scramble the information on the I and Q phase channels. Once spreading is complete, the I and Q sequences are respectively translated up to the RF center frequency via mixing with the $\cos(\omega t)$ and $\sin(\omega t)$ phases of the RF signal, respectively. The I and Q RF signals are then combined and transmitted via an antenna (not shown) over the air.

Figure 2:
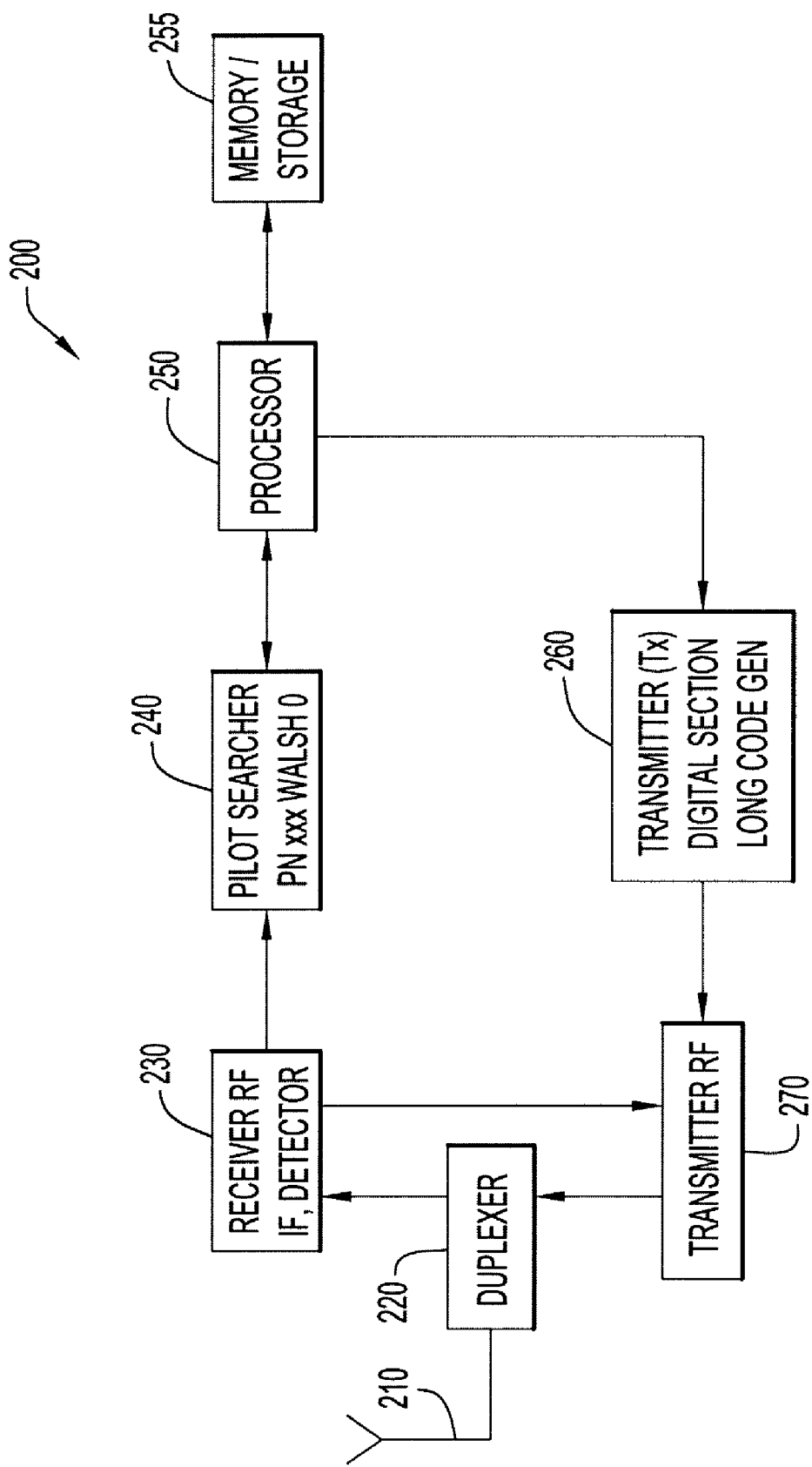
FIG. 2 is a block diagram illustrating a receiver for receiving a ranging signal in accordance with an embodiment of the invention.

FIG. 2 illustrates the relevant portions of a mobile handset transceiver system 200 for performing time of arrival (TOA) processing for an E911 call for the IS-95 example shown in FIG. 1. The architecture depicted in the diagram of FIG. 2 is conceptual and is intended to illustrate functional units and not necessarily physical relationships. While a specific embodiment is shown in FIG. 2, it will be appreciated that the invention is not limited to any particular receiver or transceiver architecture. The transceiver of FIG. 2 is a component of a mobile communication device, which can be any readily movable or portable device capable of transmitting and/or receiving signals, including but not limited to: a mobile RF transceiver or receiver, a handheld or body-mounted radio; any type of wireless telephone or handset (e.g., analog cellular, digital cellular, or satellite-based); a pager or beeper device; a navigation device; a PDA; a radio carried on, built into or embedded in a ground-based or airborne vehicle; a satellite-mounted transmitter or receiver; or any other mobile electronic device capable of transmitting and/or receiving audio, video, and data information.

As shown in FIG. 2, the TOA signal arrives at an antenna 210 and is supplied by a duplexer 220 to a receiver 230, including, for example, RF, IF, and detector hardware for recovering the transmitted waveform and information contained therein. The detected signal is supplied to a pilot searcher 240, which generates the correlation function for the short PN code used for further TOA processing in the handset processor 250. Processor 250 also supports a transmitter 260 which generates signals to be transmitted by the handset transceiver 200. Signals to be transmitted are supplied to a transmitter RF 270 which up-converts the signals to RF, and the outbound RF signals are supplied to antenna 210 via duplexer 220 for transmission over the air.

Conventionally, processor 250 interpolates three samples of the correlation function (one pre-peak sample, the peak sample, and one post-peak sample) to find the exact peak which corresponds to the TOA of the signal. TOA is converted to range and transmitted to the Position Determination Entity (PDE) where the final location solution is pieced together. The final solution combines RF ranging results with GPS measurements to add robustness to the solution when GPS is available.

In accordance with an embodiment of the invention, processor 250 uses primarily pre-peak samples to find the correlation peak rather than always using one pre-peak, the peak, and one post-peak sample. Further, the selected samples of the correlation function are processed by a leading edge curve matching algorithm rather than by an interpolation algorithm. The leading edge curve matching uses time-shifted replicas of primarily the leading edge of the ideal correlation function to match to selected sets of correlation samples. The time-shifted replicas are stored in a look-up table in a memory or storage unit 255 (FIG. 2) in the form of signal values that represent amplitudes of the ideal correlation function at discrete points in time, spaced apart by the sampling period. The best match in a least-squares sense is determined to correspond to the position of the correlation peak, which corresponds to the desired signal TOA. The resolution of the shifted replicas in the curve matching table can be about 0.5 to 1 ns, yielding a highly accurate TOA measurement and, correspondingly, a highly accurate range measurement.

Figure 3:
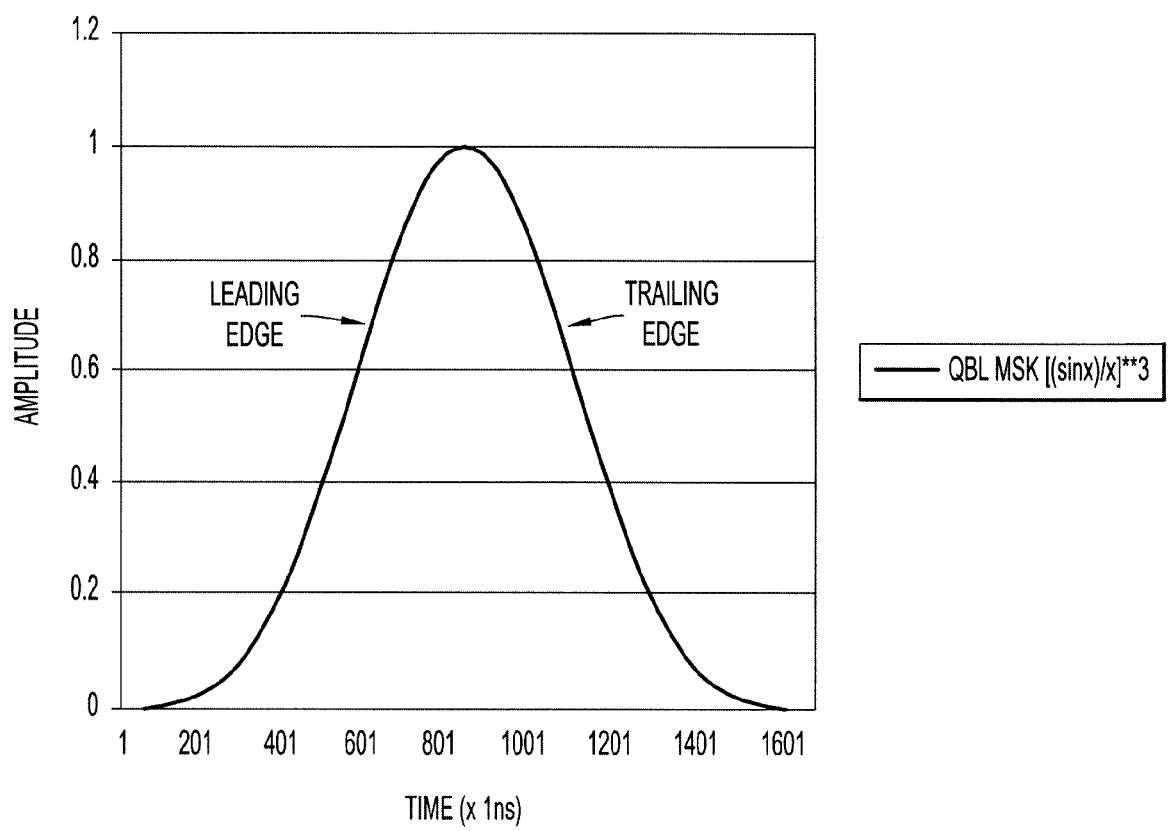
FIG. 3 is a graph of a correlation function for a QBL MSK signal illustrating the positions of the leading and trailing edges of the correlation function.

FIG. 3 is a graph illustrating an ideal correlation function for a QBL-MSK (Quasi Band Limited Minimum Shift Keying) waveform (e.g., each chip in the spread TOA signal is shaped by a modulator to ideally produce this correlation function at the detector). While a QBL-MSK correlation function is shown in FIG. 3 for convenience, the invention is not limited to any particular type of modulation, and any suitable modulation scheme can be employed, including, but not limited to: Binary Phase Shift Keying (BPSK), Quadrature Phase Shift Keying (QPSK), such as that currently used in the IS-95 standard; Offset Quadrature Phase Shift Keying (OQPSK); Minimum Shift Keying (MSK); Raised Cosine Filtered Offset Quadrature Phase Shift Keying (RC-OQPSK); Gaussian MSK, Tamed Frequency Modulation (TFM); Intersymbol Jitter Free Offset Quadrature Phase Shift Keying (IJF-OQPSK); and bandwidth efficient Continuous Phase Modulation (CPM) schemes. To reduce the transmission bandwidth, each of the I and Q chips can be pulse-shaped by the modulator. For example, square wave (used for Offset Quadrature Phase Shift Keying, OQPSK), cosine (used for Minimum Shift Keying, MSK), raised cosine (used for Raised Cosine Filtered Offset Quadrature Phase Shift Keying, RC-OQPSK), and quasi-bandlimited (used for Quasi-bandlimited Minimum Shift Keying, QBL-MSK) pulse shaping can be used. All of these pulse-shaping types provide a given power spectrum and RF envelope properties.

The receiver correlates the received signal with a correlation function to produce a stream of correlation samples including a peak sample, a plurality of pre-peak samples, and a plurality of post-peak samples. The time of arrival of the signal corresponds to a timing of a peak of the correlation function, which lies in a vicinity of the peak sample. For example, in FIG. 3, the pre-peak samples would correspond to samples taken along the left-hand side of the waveform, and the post-peak samples would correspond to samples taken along the right-hand side of the waveform. Is it possible for the timing of the peak sample to precisely correspond with the timing of the true peak of the correlation function, but most often the peak sample occurs sometime slightly before or after the true correlation peak whose timing is sought. In particular, there are two possible scenarios: the timing of the true peak is at or before the timing of the peak sample, or the timing of the true peak is after the timing of the peak sample.

Figure 4:
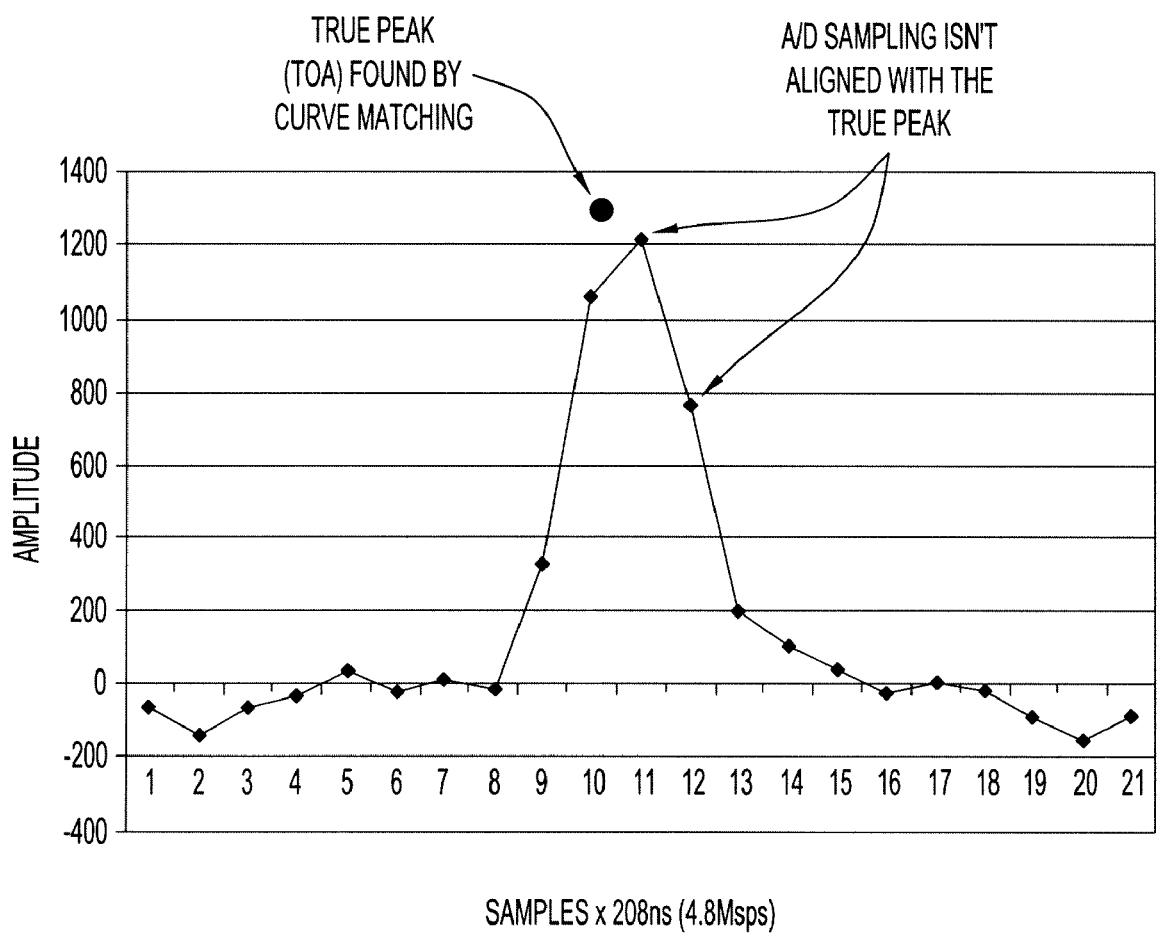
FIG. 4 is a graph illustrating a stream of correlator output samples for a received QBL MSK signal.

FIG. 4 shows one example of the output sample stream of a QBL-MSK correlator. Note that the timing of the A/D sampling is not perfectly aligned with the timing of the true peak. In this case, the true peak lies somewhere between the peak sample and the nearest pre-peak sample. A precise estimate of the location of the true peak can be determined by curve matching in accordance with the invention. In the example shown in FIG. 4, the sample rate at the output of the correlator is 4.8 Msps. It will be appreciated that the invention is not limited to any particular chip rates or correlator sample rates. For example, the sample rate could be four or more times the chip rate, resulting in more samples near the correlation peak which can be used for more precise curve matching.

At the handset receiver, since the timing of the A/D sampling of the correlator is essentially random relative to the timing of the true correlation peak, it is not known in advance whether the true peak lies before or after the peak sample detected. According to an embodiment of the invention, the curve matching process accounts for these two different scenarios by selecting different sets of correlation samples to compare to subsets of the stored, time-shifted correlation function replicas. In particular, a curve matching table is stored in the handset transceiver (e.g., in a non-volatile memory module). The table includes a plurality of sets of values. The values in each set represent magnitudes of discrete points of an ideal correlation function having a peak at a particular time shift relative to the timing of the last sample occurring before the correlation peak (which may be the peak sample or the nearest pre-peak sample). The table includes a set of such values for each of a number of equally spaced timing offsets that span the sample period. For example, the correlator output shown in FIG. 4 may have a sample rate of 4.8 Msps, corresponding to a sample period of 208 ns. The curve matching table may have 208 sets of values, each set corresponding to a different timing offset in 1 ns increments. In other words, in this example, the 208 ns span between the peak sample and the next greatest sample is essentially subdivided into 208 equal increments by the 208 time-shifted correlation function replicas, providing a 1 ns resolution. One of these time-shifted correlation functions will ultimately be determined to correspond to the timing of the correlation peak.

Figure 5:
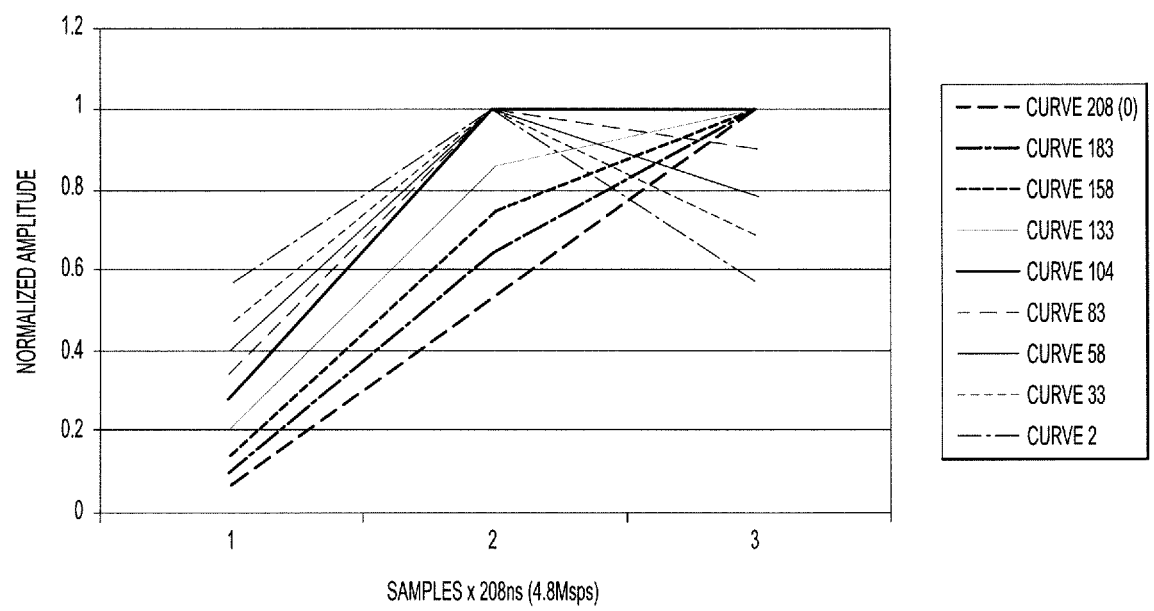
FIG. 5 is a graph illustrating selected sets of values that respectively represent signal levels at discrete points of different time-shifted correlation function replicas.

FIG. 5 graphically illustrates a number of such sets of values which represent respective time-shifted correlation functions. For simplicity, each of the time-shifted correlation function replicas shown in FIG. 5 is represented by only three discrete points; however, it will be appreciated that each time-shifted correlation function could be represented by more points along the leading edge of the correlation function curves. The sets of values can be stored in a look-up table stored in a memory. In this example, the look-up table would include 208 sets of three values. While the number of sets of values stored in this example is 208, any suitable number of sets of values can be used, depending on the correlator sample period and the desired resolution between adjacent time-shifts of the sets of values.

Since in the ideal case, the true correlation peak lies between the two greatest amplitude values, the numbering of the curves relates to the timing of the correlation peak relative to the first of the two greatest values. In half of the cases, the timing of the correlation peak is closer to the first of the two greatest amplitude values, resulting in the first value having the greater amplitude. In the other half of the cases, the timing of the correlation peak is closer to the second of the two greatest amplitude values, resulting in the second value having the greater amplitude. The curve denoted as curve 208 (or equivalently "curve 0") in FIG. 5 represents no time shift (a time shift of zero) between the true correlation peak and the timing of the peak sample, i.e., the peak sample is precisely aligned with the true peak (or equivalently, a time shift of exactly one full sample period of 208 ns relative to the closest pre-peak sample). Curve 183 represents a correlation function where the true peak occurred 183 ns after the last pre-peak sample (25 ns before the peak sample), curve 158 represents a correlation function where the true peak occurred 158 ns after the last pre-peak sample (50 ns before the peak sample), etc.

In this example, all of curves 105-208 represent scenarios in which the true correlation peak lies before the peak correlation sample, as suggested by the fact that the third value in the set is greater than the second value in the set, which in turn is greater than the first value in the set. On the other hand, curves 1-103 represent scenarios in which the true correlation peak lies after the peak sample, in particular, between the peak sample and the first post-peak sample. This is suggested by the fact that the third value in the set is less than the second value in the set in each case. Curve 104 represents the scenario in which the true correlation peak lies exactly halfway between two peak samples of equal amplitude.

Figure 6A:
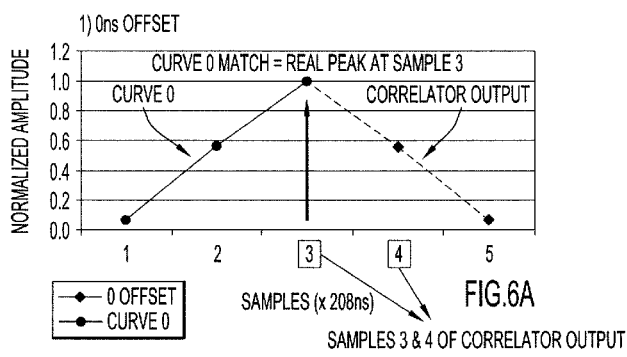
FIGS. 6A-6D are graphs illustrating the relationship between four of the time-shifted correlation function replicas and the timing of the true correlation peak.

The graphs of FIGS. 6A-6D illustrate how some of the time-shifted correlation curves represented by discrete values in FIG. 5 relate to the true correlation peak. The graph of FIG. 6A shows an idealized correlator output that includes equally spaced numbered samples 1-5 along the x-axis, whose normalized amplitudes are shown relative to the y-axis. In this case, the true peak of the correlation function occurs precisely at the timing of the third sample of the correlator output. Consequently, the amplitudes of the 5 samples form a symmetric pattern about the peak at sample 3, with samples 1 and 2 being taken along the leading edge of the correlation function, and samples 4 and 5 being taken along the trailing edge of the correlation function. The amplitudes of samples 2 and 4 are equal to each other and less than the amplitude of peak sample 3, while the amplitudes of samples 1 and 5 are equal to each other and less than the amplitudes of samples 2 and 4. Thus, this sample timing represents a timing offset of 0 ns between the true correlator peak and the peak sample and ideally would produce this set of samples. Curve 0 (also called curve 208) in FIG. 5 is constructed from the amplitude values of samples 1, 2, and 3, i.e., two pre-peak samples and the peak sample of the idealized correlation function with this 0 ns timing offset.

Figure 6B:
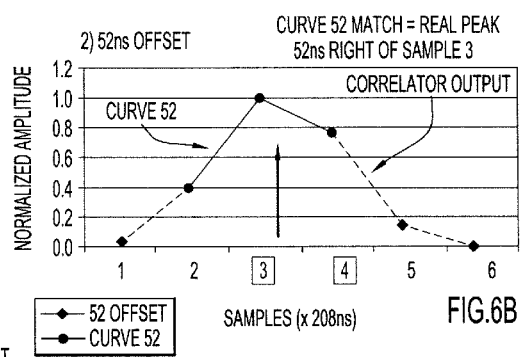

The graph of FIG. 6B shows an idealized correlator output that includes 6 samples with a different timing offset between the true correlation function peak and the peak sample. Here, the true correlation function peak occurs between the two greatest amplitude samples (3 and 4), in particular, 52 ns after (to the right of) of sample 3. The amplitude of sample 3 is higher than that of sample 4, because the true correlation peak is closer to the timing of sample 3 than sample 4, making sample 3 the peak sample and sample 4 the first post-peak sample, with the second greatest amplitude among the samples. Sample 2 is the first (closest) pre-peak sample and has the next greatest amplitude, and the second post-peak sample (sample 5) has the next greatest amplitude. Thus, a sample timing offset with the true correlation peak occurring 52 ns after the peak sample would ideally produce this set of samples. Curve 52 is constructed from the amplitude values of samples 2, 3, and 4, i.e., one pre-peak sample, the peak sample, and one post-peak sample of the idealized correlation function with this 52 ns timing offset.

Figure 6C:
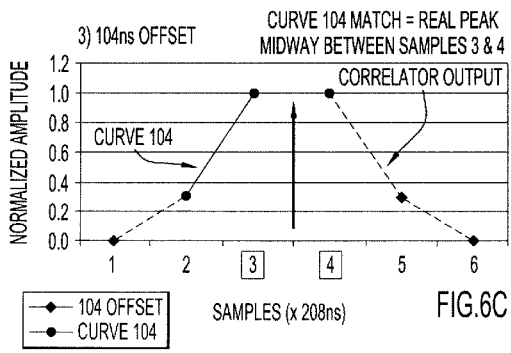

The graph of FIG. 6C shows an idealized correlator output that includes 6 samples with yet a different timing offset between the true correlation function peak and the peak sample. In particular, the timing of the true correlation function peak is 104 ns after (to the right of) the sample 3 and 104 ns before sample 4 (i.e., halfway between samples 3 and 4) in this case, yielding the ideal sample amplitudes shown in FIG. 6C. In particular, since the true correlation peak lies exactly halfway between samples 3 and 4, samples 3 and 4 have the same amplitude and the greatest amplitude. The remaining samples form a symmetric shape, with samples 2 and 5 having a same, lower amplitude, and samples 1 and 6 have a same, still lower amplitude. Thus, a sample timing offset of 104 ns between the true correlation peak and the peak sample would ideally produce this set of samples. Curve 104 in FIG. 5 is constructed from the amplitude values of samples 2, 3, and 4, i.e., one pre-peak sample, and the two peak samples of the idealized correlation function with this 104 ns timing offset. For purposes of discussion above, curve 104 was grouped with curves 1-103, with the second value being that of the first of the two peak samples, and the third value being that of the second of the two peak samples (treated as a post-peak sample to the first of the two peak samples). However, curve 104 could also be grouped with curves 105-208, since, equivalently, the first of the two peak sample could be considered a pre-peak sample to the second of the two peak samples.

Figure 6D:
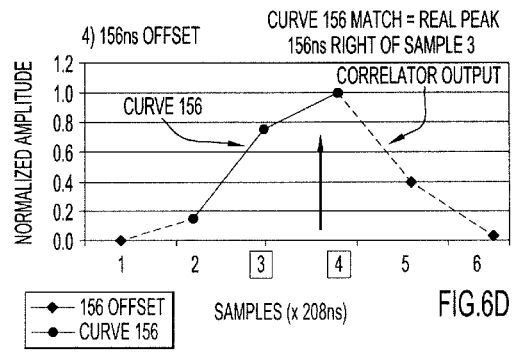

The graph of FIG. 6D shows an idealized correlator output that includes 6 samples with yet another different timing offset between the true correlation function peak and the peak sample. In particular, the true correlation function peak lies between samples 3 and 4 (again, the two greatest amplitude samples), but in this case is closer to sample 4, i.e., 156 ns after (to the right of) sample 3. Consequently, sample 4 is the peak sample in this case, and sample 3, which is the first pre-peak sample, has the second greatest amplitude. Sample 5 is the first post-peak sample and has the next greatest amplitude, and the second pre-peak sample (sample 2) has the next greatest amplitude. Thus, a sample timing offset with the true correlation peak occurring 156 ns after a sample (i.e., 52 ns before the peak sample) would ideally produce this set of samples. Curve 156, of the 208 curves in this example, is constructed from the amplitude values of samples 2, 3, and 4, i.e., two pre-peak samples, and the peak sample of the idealized correlation function with this 156 ns timing offset.

Thus, the curve matching table comprises first sets of values representing time shifts in which the true correlation peak falls at or before the peak sample and second sets of values representing time shifts in which the true correlation peak falls after the peak sample. The first sets of values in the example shown in FIGS. 5 and 6A-6D are the sets that form curves 105-208, and the second sets of values are the sets that form curves 1-104 (technically, curve 104 could be considered a member of either group, since the second and third values are equal). In a general case, the first sets of values (curves) could be numbered (N/2+1) to N and the second sets of values (curves) could be numbered 1 to N/2, where N is the number of time-shifted correlation function curves being represented by sets of values.

In the case of the first sets of values, the last value in each set corresponds to the peak sample, and the preceding values correspond to the preceding pre-peak samples. Thus, the first sets of values are used to perform leading edge curve matching in which no post-peak samples are involved (i.e., the leading-edge curve matching occurs at and before the peak sample). On the other hand, in the case of the second sets of values, the last value in each set corresponds to the first post-peak sample, the second-to-last value corresponds to the peak sample, and the preceding value(s) correspond to the preceding pre-peak sample(s). Thus, the second sets of values are used to perform leading edge curve matching in which one post-peak sample, the peak sample, and at least one pre-peak sample are involved (i.e., the leading-edge curve matching occurs at and before the first post-peak sample). In both the first sets of values and the second sets of values, each set of values includes ideal sample values corresponding to the two greatest amplitude samples that would occur with the particular timing represented by the set of values and at least one additional ideal sample value corresponding to one or more pre-peak samples which precede the two greatest amplitude samples.

Note that the use of three discrete values to represent the time-shifted correlation functions is merely an example, and more than three samples can be used, depending on the relationship between the correlator sampling rate and the signal chip rate (a higher sampling rate produces a greater number of meaningful samples in the vicinity of the correlation peak with which to perform curve matching). If more than three values are used to represent the time-shifted versions of the correlation function, the additional values are used to represent amplitudes at discrete points along the leading edge of the ideal correlation function, corresponding to additional pre-peak samples. The invention differs significantly from conventional leading-edge curve fitting algorithms, which generally seek to avoid use of any post-peak samples. However, use of one post-peak sample in certain cases allows the technique described herein to benefit from the use of discrete values in a look-up table rather than having to employ a more complex curve fitting algorithm, while still minimizing the impact of multipath interference resulting from use of post-peak samples in all cases.

Figure 7:
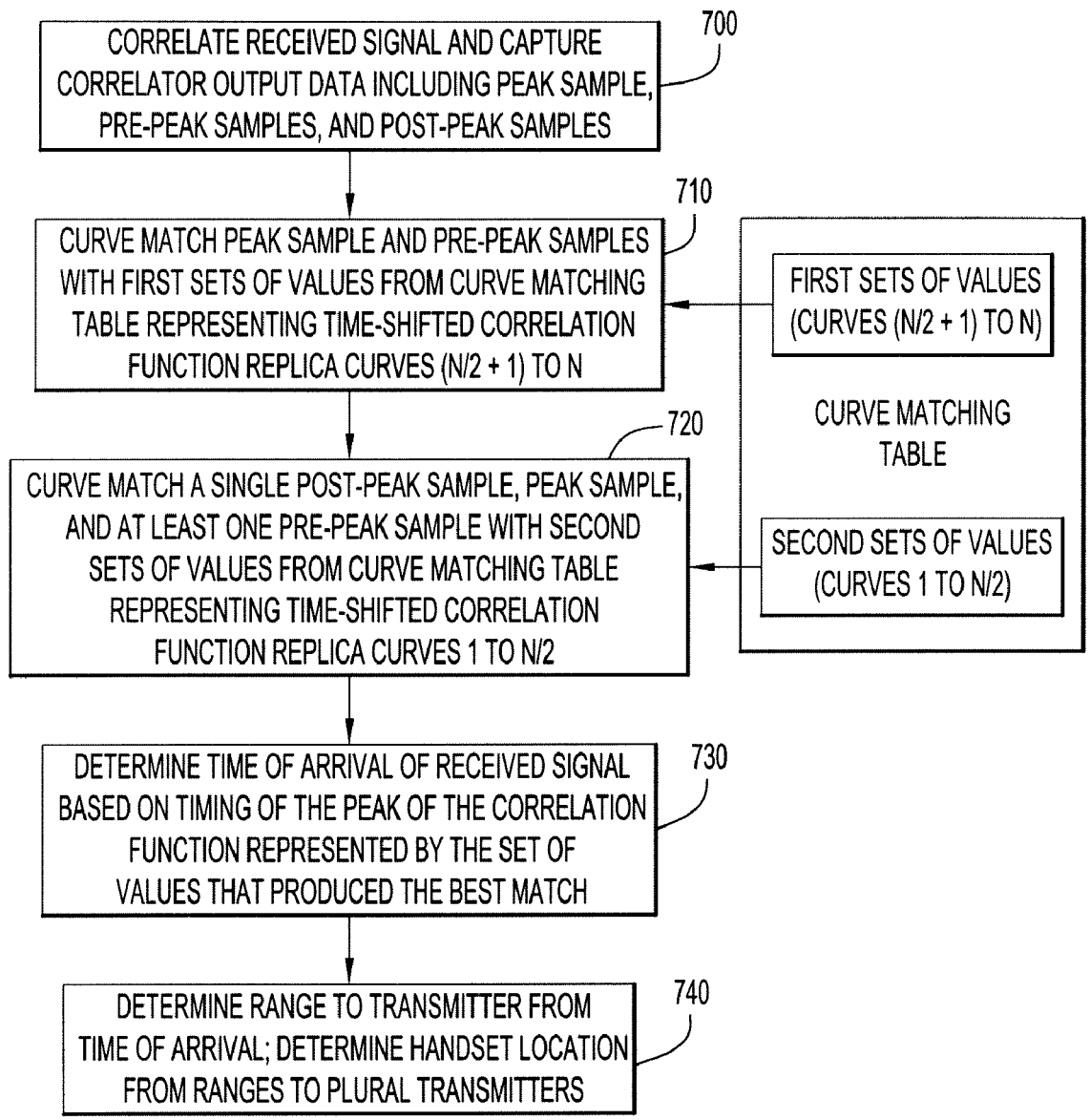
FIG. 7 is a functional flow diagram illustrating operations performed to determine the timing of the peak of the correlation function in accordance with an embodiment of the invention.

The methodology employed to determine the time of arrival of a signal in accordance with an embodiment of the invention is shown in FIG. 7. In operation 700, a received signal is correlated in accordance with a correlation function to produce a stream of correlation samples as previously described. The relevant correlator output data is captured for further processing, including the peak sample, a plurality of pre-peak samples, and a plurality of post-peak samples. The further processing described below can be performed, for example, by the processor represented by block 250 in the transceiver system shown in FIG. 2. Again, the time of arrival of the received signal corresponds to a timing of the true peak of the correlation function, which lies in a vicinity of the peak sample (either between the peak sample and the first (closest) pre-peak sample or between the peak sample and the first (closest) post-peak sample. A curve matching table stores a plurality of sets of values, where each set of values represents discrete points of a correlation function having a peak at a respective different time shift relative to the timing of the peak sample. The stored sets of values include first sets of values to be matched with a first set of samples from the stream of correlation samples and second sets of values to be matched with a second set of samples from the stream of correlation samples.

In operation 710, each of the first sets of values is matched to the first set of samples. In particular, the first set of samples includes the peak sample and only pre-peak samples (no post-peak samples). In the example described above, this first set of samples includes three samples: the peak sample and the two closest pre-peak samples. The first sets of values are the 104 different sets of three values that represent time-shifted correlation function curves 105-208 (or, more generally, time-shifted correlation function replica curves (N/2+1) to N, where N is the total number of time-shifted correlation curves). In other words, about half of the stored sets of values are among the first sets of values. For each first set of values, each of the samples in the first set is matched pair-wise with a discrete value in the set of values. In the foregoing example, the peak sample is paired with the third (and largest amplitude) value in the set, the closest pre-peak sample is paired with the second (and second largest amplitude) value, and the next closest (and smallest amplitude) pre-peak sample is paired with the first (and smallest amplitude) value. A least-squares metric can be used to determine which set of values provides the best fit to the samples. For example, a difference can be determined between the sample and the stored value of each pair, and the sum of the squares of these differences provides a metric of how well the three sample points match the three values in each set of values. This process is repeated with the first set of samples for each of the first sets of values (in this example, for each of the sets of values representing the 104 curves numbered 105-208). While a least-squares metric is described herein, other measures of best fit can be employed to determine which set of values best fits the selected set of correlation samples.

In operation 720, each of the second sets of values is matched to the second set of samples. In particular, the second set of samples includes one post-peak sample, the peak sample, and at least one pre-peak sample (only one pre-peak sample is used in the foregoing example, but additional pre-peak samples can be used, particularly with a higher sampling rate). Note that the second set of samples is different from the first set of samples. Thus, different sets of samples are selected from the stream of correlator samples depending on which time-shifted replica of the correlation function is being matched. That is, about half of the sets of curve values are matched to one set of correlator samples from the output stream and the other half of the sets of curve values are match to a different set of correlator samples from the output stream. In both cases, the peak sample and the nearest pre-peak sample are included in the set of samples, and in half of the cases the nearest post-peak sample is included, whereas the other half of the cases includes no post-peak samples and an additional pre-peak sample.

In the example above, the second sets of values are the 104 different sets of three values that represent time-shifted correlation function curves 1-104 (or, more generally, time-shifted correlation function replica curves 1 to N/2). In other words, the other half of the stored sets of values (those not among the first sets of values) are among the second sets of values. For each second set of values, each of the samples in the second set is matched pair-wise with a discrete value in the set of values. In the foregoing example, the closest post-peak sample is paired with the third value in the set (which has the second greatest amplitude), the peak sample is paired with the second (and largest amplitude) value, and the closest pre-peak sample is paired with the first (and smallest amplitude) value in the set. The least-squares metric can again be used to determine which set of values provides the best fit to the samples by computing a sum of the squares of the differences between the sample and the stored value of each pair. This process is repeated with the second set of samples for each of the second sets of values (in this example, for each of the sets of values representing the 104 curves numbered 1-104). Note that the first set of samples is compared only to the first sets of values and the second set of samples is compared only to the second sets of values. It is not necessary to compare the first set of samples to the second sets of values or to compare the second set of samples to the first sets of values, since these comparisons are very unlikely to yield a best fit given the amplitudes of the samples and the values in the sets.

In operation 730, the time of arrival of the received signal is determined based on the set of values from among all of the first and second sets of values representing the entire group of time-shifted correlation functions that produces the best match, e.g., the lowest least-squares metric value. If the set of values that produces the best match is among the first sets of values, this means the measured correlation peak falls before the peak sample. For example, if curve 156 shown in FIG. 6D produces the best match, the correlation peak is determined to be 156 ns after sample 3 (or equivalently, 52 ns before peak sample 4). On the other hand, if the set of values that produces the best match is among the second sets of values, this means the measured correlation peak falls after the peak sample. For example, if curve 52 shown in FIG. 6B produces the best match, the correlation peak is determined to be 52 ns after peak sample 3. In this example in general, the position of the correlation peak measurement will fall within one half of the chip period on either side of the peak sample (i.e., at one of the 208 possible timings represented by the 208 sets of values).

Referring again to FIG. 7, in operation 740, the range to the transmitter that sent the received signal can be determined from the time of arrival of the received signal. For example, with a system employing the IS-95 standard as described above, the time required for the signal to traverse the distance between the transmitter and receiver can be determined by subtracting the transmit time from the time of arrival, and range can be determined from the well-known relationship: range=c*time, where c is the speed of light. The TOA measurement technique can also be used in a system that employs a two-way, round-trip ranging message scheme in which the time of arrival of the ranging messages is accurately determined to yield accurate range estimates.

By measuring the range to four or more transmitters in this manner, the geographic location of the mobile communication device can be determined using trilateration. The mobile communication device can perform the trilateration computations (e.g., in processor 250 shown in FIG. 2) and thereby locally determine position at the mobile communication device. The position information can be displayed on the display of the mobile communication device (e.g., on a map or the like) to provide navigation to the user. Further, the position information can be forwarded to a base station or other remote device to inform the system or others of the mobile communication device's position (e.g., to support E911). In the example transceiver shown in FIG. 2, the position information is forwarded from processor 250 to transmitter 260, which generates a transmission signal containing the position information. The transmission signal is upconverted to RF by transmitter RF 270 and supplied to antenna 210 via duplexer 220 for transmission over the air.

According to another option, the range information can be forwarded from the mobile communication device to a base station, and the mobile communication device's position can be determined remotely from several such range measurements. If necessary, the position information can be supplied back to the mobile communication device for display and/or made available to support E911 or other operations within the communication system. As previously mentioned, the range information determined from the technique described herein can be augmented with GPS information, when available, to provide a more robust location determination.

The TOA measurement scheme described herein can be used to provide situation awareness in military exercises, to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile communication devices can receive and display position information for other related personnel, so that soldiers in the field are provided with situation awareness for their immediate surroundings.

The technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The technique is also useful in systems used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the invention can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; location of prisoners in a detention facility; or to track the movements of parolees. The mobile radio could be carried on the body by incorporating the radio into clothing, such as a bracelet, a necklace, a pocket or the sole of a shoe. The invention can also be applied in systems used in locating the position of mobile telephones, as explained above. This capability could also be used to assist in cell network management (e.g., in cell handoff decisions) and to support the E911 location of mobile telephones for emergency purposes, as previously described.

As previously noted, the use of a standard PN sequence in the ranging waveform within the IS-95 standard results in a correlation function with high side lobes and poor multipath performance. To achieve better performance, the pilot signal PN spreading sequence can be replaced with a code that results in lower side lobes at the output of the correlator such as Gold or primitive codes.

Having described preferred embodiments of new and improved methods and apparatus for accurately determining signal time of arrival, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for determining the time of arrival of a signal at a mobile communication device, comprising:
    (a) correlating a received signal in a receiver in accordance with a correlation function to produce a stream of correlation samples including a peak sample, a plurality of pre-peak samples, and a plurality of post-peak samples, wherein the time of arrival of the signal corresponds to a timing of a peak of the correlation function, which lies in a vicinity of the peak sample;
    (b) storing a curve matching table comprising a plurality of sets of values, each of the sets of values representing discrete points of a correlation function having a peak at a respective different time shift relative to the timing of the peak sample, wherein the plurality of sets of values includes first sets of values to be matched with a first set of samples from the stream of correlation samples and second sets of values to be matched with a second set of samples from the stream of correlation samples;
    (c) matching each of the first sets of values to the first set of samples, the first set of samples including no post-peak samples;
    (d) matching each of the second sets of values to the second set of samples, the second set of samples including at least one post-peak sample, wherein one set of values among the first and second sets of values produces a best match; and
    (e) determining the time of arrival of the signal based on timing of the peak of the correlation function represented by the one set of values that produced the best match.

2. The method of claim 1, wherein the first sets of values are not matched to the second set of samples and the second sets of values are not matched to the first set of samples.

3. The method of claim 1, wherein (b) includes storing the curve matching table in a look-up table.

4. The method of claim 1, wherein:
    (c) includes, for each first set of values, pairing each sample in the first set of samples with a corresponding value in the first set of values and performing a least-squares computation on differences of each pair; and (d) includes, for each second set of values, pairing each sample in the second set of samples with a corresponding value in the second set of values and performing a least-squares computation on differences of each pair.

5. The method of claim 1, wherein the first sets of values represent time-shifted correlation functions having a peak after the peak sample, and the second sets of values represent time-shifted correlation functions having a peak before the peak sample.

6. The method of claim 1, further comprising:
(f) determining range to a source of the signal from the time of arrival of the signal.

7. The method of claim 6, further comprising:
(g) transmitting information about the range to another device.

8. The method of claim 1, further comprising:
(f) determining a position of the mobile communication device from the range to a plurality of sources of signals.

9. The method of claim 1, further comprising:
(f) controlling a display device of the mobile communication device to display information about the mobile communication device's position determined from the time of arrival of the signal.

10. A mobile communication device, comprising:
a receiver configured to receive a signal in accordance with a correlation function to produce a stream of correlation samples including a peak sample, a plurality of pre-peak samples, and a plurality of post-peak samples, wherein the time of arrival of the signal corresponds to a timing of a peak of the correlation function, which lies in a vicinity of the peak sample;
a storage device configured to store a curve matching table comprising a plurality of sets of values, each of the sets of values representing discrete points of a correlation function having a peak at a respective different time shift relative to the timing of the peak sample, wherein the plurality of sets of values includes first sets of values to be matched with a first set of samples from the stream of correlation samples and second sets of values to be matched with a second set of samples from the stream of correlation samples;
a processor configured to: match each of the first sets of values to the first set of samples, the first set of samples including no post-peak samples; match each of the second sets of values to the second set of samples, the second set of samples including at least one post-peak sample, wherein one set of values among the first and second sets of values produces a best match; and determine the time of arrival of the signal based on a timing of the peak of the correlation function represented by the one set of values that produced the best match.

11. The mobile communication device of claim 10, wherein the processor does not match the first sets of values to the second set of samples and the processor does not match the second sets of values to the first set of samples.

12. The mobile communication device of claim 10, wherein the storage device is configured to store the curve matching table in a look-up table.

13. The mobile communication device of claim 10, wherein:
the processor matches each of the first sets of values to the first set of samples by pairing each sample in the first set of samples with a corresponding value in the first set of values and performing a least-squares computation on differences of each pair; and
the processor matches each of the second sets of values to the second set of samples by pairing each sample in the second set of samples with a corresponding value in the second set of values and performing a least-squares computation on differences of each pair.

14. The mobile communication device of claim 10, wherein the first sets of values represent time-shifted correlation functions having a peak after the peak sample, and the second sets of values represent time-shifted correlation functions having a peak before the peak sample.

15. The mobile communication device of claim 10, wherein the processor is further configured to determine a range to a source of the signal from the time of arrival of the signal.

16. The mobile communication device of claim 15, further comprising:
a transmitter configured to transmit information about the range to another device.

17. The mobile communication device of claim 15, wherein the processor is further configured to determine a position of the mobile communication device from the range to a plurality of sources of signals.

18. The mobile communication device of claim 10, further comprising:
a display device configured to display information about the mobile communication device's position determined from the time of arrival of the signal.

19. The mobile communication device of claim 10, wherein the mobile communication device is a mobile telephone and information determined from time of arrival of the signal is transmitted by the mobile telephone to support an emergency response system.

20. A computer readable medium storing instructions, that when executed by a computer, cause the computer to perform functions of:
receiving a stream of correlation samples resulting from correlating a received signal in accordance with a correlation function, the correlation samples including a peak sample, a plurality of pre-peak samples, and a plurality of post-peak samples, wherein the time of arrival of a signal corresponds to a timing of a peak of the correlation function, which lies in a vicinity of the peak sample;
retrieving data from a curve matching table comprising a plurality of sets of values, each of the sets of values representing discrete points of a correlation function having a peak at a respective different time shift relative to the timing of the peak sample, wherein the plurality of sets of values includes first sets of values to be matched with a first set of samples from the stream of correlation samples and second sets of values to be matched with a second set of samples from the stream of correlation samples;
matching each of the first sets of values to the first set of samples, the first set of samples including no post-peak samples;
matching each of the second sets of values to the second set of samples, the second set of samples including at least one post-peak sample, wherein one set of values among the first and second sets of values produces a best match; and
determining the time of arrival of the signal based on timing of the peak of the correlation function represented by the one set of values that produced the best match.

* * * * *